Aug. 11, 1931.    J. KIENER    1,818,225
APPARATUS FOR SUCCESSIVELY DISTRIBUTING VARIABLE AND
ADJUSTABLE QUANTITIES OF ANY LIQUIDS
Filed June 26, 1929
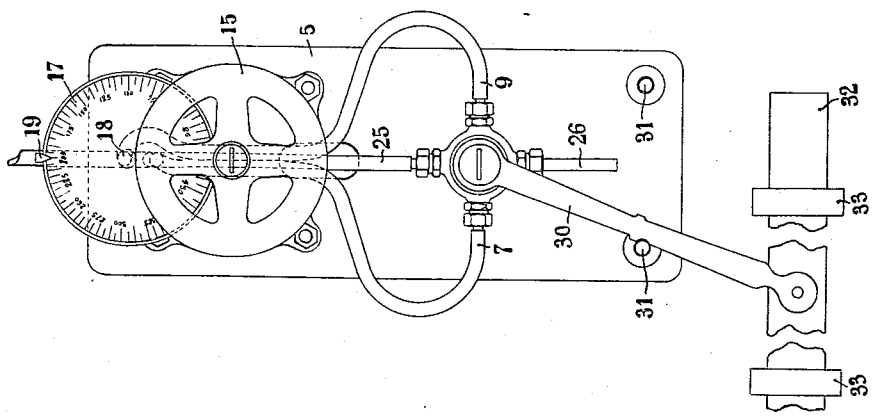
INVENTOR
Jean Kiener
BY
ATTORNEYS Patented Aug. 11, 1931

1,818,225

UNITED STATES PATENT OFFICE

JEAN KIENER, OF ST.-DIE, FRANCE, ASSIGNOR TO SOCIETE ANONYME ETABLISSEMENTS JULES MARCHAL, OF ST.-DIE, VOSGES, FRANCE

APPARATUS FOR SUCCESSIVELY DISTRIBUTING VARIABLE AND ADJUSTABLE QUANTITIES OF ANY LIQUIDS

Application filed June 26, 1929, Serial No. 373,850, and in France July 5, 1928.

The present invention has for its object an apparatus which is constructed in such a manner as to allow of successively distributing variable and adjustable quantities of any liquids, this apparatus being provided with a distant control and being particularly adapted to be used for giving the required degree of moisture to any textile materials.

The liquid distributing apparatus in accordance with the invention is essentially characterized by the fact that it comprises: a cylinder enclosing a piston the stroke of which is adjustable, this cylinder being connected, through the medium of two pipe lines respectively extending from its two heads, to two of the diametrally opposed apertures of the body of a four-way cock, the two other apertures being connected: one to the source of the liquid under pressure to be distributed, and the other to the pipe or member distributing this liquid; the cock enclosing a plug having two diametrally opposed ports each extending on a quarter of the circumference, this plug being angularly movable in the said body or casing in two opposite directions so that at the end of each displacement of the said plug the ports of the latter are brought in such a position that the cylinder is simultaneously put in communication, through one of its heads, with the source of the liquid to be distributed, and, through the other head, with the distributing pipe, and that, under the pressure of the liquid admitted into the cylinder through one of its heads, the piston arranged in the said cylinder is pushed towards the other head opposite to the admission side and delivers, through the orifice in this head and the distributing pipe, the liquid contained in the said cylinder and admitted in the latter, in the preceding operation of distribution, the change of position of the plug after each displacement of the piston reversing the direction of the distribution.

Owing to this special arrangement, the quantities of liquid which are successively delivered through one and the other bottom of the cylinder correspond to a volume generated by the displacements, in the said cylinder, of the piston which is alternately subjected on either of its faces to the pressure of the liquid successively admitted in the cylinder through one and the other of its heads, according to the position given to the plug of the distributing cock.

For allowing to vary at will the quantities of liquid distributed by the apparatus, the piston is mounted in the cylinder so that its stroke can be conveniently adjusted from the exterior of the cylinder.

For that purpose, the piston is secured in the middle of the length of a central rod which is guided, at one of its ends, in a socket provided in one of the cylinder heads and, at its other end, in a bore formed in a screw in engagement with a screw-threaded hole formed in the other cylinder head, the screw extending outside this cylinder head and terminating in a hand wheel or other operating member allowing, by screwing or unscrewing, to move towards or away from the piston the inner end of the said screw which serves as an abutment for the piston, and to thus adjust at will the length of the stroke of the latter.

On the stem of the screw, and outside the cylinder is moreover secured a pinion in gear with a toothed plate or disc graduated on one of its faces in units of volume or of weight of liquid and so arranged as to angularly move opposite a fixed index and to thus indicate for each position of the screw, the quantity or the weight of liquid which will be distributed at each stroke of the piston.

Finally, the plug of the distributing cock is provided with a control lever, the angular movement of which is limited between two fixed abutments, and which is attached at its free end to a wooden bar sliding in suitable guides and extending throughout the length of the distance to be served, so as to allow, by acting at any point of the said bar, of actuating from a distance the distributing cock.

The apparatus in accordance with the invention will be described hereinafter with reference to the accompanying drawings in which:

Fig. 1 is a front view.

Fig. 2 is a longitudinal vertical section.

Figs. 3 and 4 are two cross vertical sections of the distributing cock showing the two extreme positions of the plug As illustrated in the drawings, the apparatus in accordance with the invention, comprises a cylinder 1 closed in a fluid-tight manner at both ends by two heads 2 and 3 and enclosing a piston 4 movable in the said cylinder.

The cylinder 1, which is rigidly secured on a vertical supporting plate 5, is perforated, in one of its heads 2, with an opening adapted to receive a nipple 6 on which is branched a tube 7, and, in the second head 3, with another opening in which is secured a nipple 8 receiving a tube 9.

The piston 4 is rigidly secured in the middle of the length of a rod 10 which is guided, at one of its ends, in a socket 11 formed in the center of the head 2 of the cylinder 1, and at the other end, in a bore 12 formed in the axis of a screw 13 in engagement with a screw-threaded hole provided in the second head 3 of the cylinder 1.

The inner end of the guide socket 11 of the piston and the inner end of the screw sleeve 13 form two abutments between which the piston 4 can move, as will be explained hereinafter, and the screw 13 is provided with a hand wheel 15 which allows, by a rotation in the suitable direction imparted to the said hand wheel, to modify the position of the inner end of the said screw and, consequently, of adjusting the length of the displacements of the piston.

This screw 13 carries, moreover, a pinion 16 gearing with a toothed wheel 17 loosely mounted on a spindle 18 and bearing on its front face graduations which, during the rotation of the screw 13, move opposite a fixed index 19 and immediately indicate, by simple reading, the quantity of liquid which will be distributed by the apparatus at each stroke of the piston 4.

On the supporting plate 5 and below the cylinder 1 is rigidly secured the casing 20 of a cock in the wall of which are formed four orifices 21, 22, 23 and 24 arranged as clearly shown in Figs. 3 and 4.

Two of these orifices 21, 22 are connected, through the medium of suitable couplings to the two tubes 7 and 9 respectively branched on the heads 2 and 3 of the cylinder 1, and the two other orifices of the casing 20, also provided with couplings, are connected: the orifice 23, through the medium of a conduit 25, with the source of the liquid under pressure to be distributed, and the orifice 24 through the medium of a coupling 26, with the hose (not shown) provided with any suitable member distributing the liquid under the desired form at the point of utilization.

Within the casing 20 is mounted a conical plug 27 in which are formed two diametrically opposed ports 28 and 29 extending on a quarter of the circumference of the said plug, which, by angular displacements, can be brought in either of the two positions shown in Figs. 3 and 4.

Referring to Fig. 3, it will be seen that the port 28, in this position of the plug 27, puts in communication the orifices 23 and 21 of the casing 20, and that the second port 29 of the said plug puts in communication the two other ports 22 and 24 of the casing 20.

Consequently, the liquid under pressure is caused to circulate in the conduit 25, orifice 23, port 28, orifice 21, and is admitted into the cylinder 1 through the conduit 7 and through the nipple 6 secured in the head 2 of the said cylinder.

This cylinder is simultaneously put in communication, on the side opposite to the head 2, through the nipple 8, tube 9, orifice 22 of the casing 20, port 29 of the plug, and orifice 24 of the casing, with the coupling 26 carrying the distributing conduit.

Owing to this arrangement, the liquid under pressure admitted, as just explained, in the cylinder 1 through the nipple 6, acts on the left-hand face of the piston 4 and moves the latter towards the head 3 of the said cylinder, until this piston is stopped in its movement by abutting against the inner end of the screw 13.

During this movement, the piston has delivered through the nipple 8, tube 9 and the orifices and ports 22—20 and 24 of the distributing cock, a quantity of liquid rigorously determined by the distance the piston is allowed to move, but this distance can be modified at will by variation of the position of the inner end of the screw 13.

In Fig. 4, it will be seen that the orifice 23 of the casing is put in communication with the orifice 22 of the said casing through the port 29, so that the liquid under pressure which is caused to circulate in the conduit 25 connected to the orifice 23, enters the cylinder 1 through the conduit 9 branched on 22 and on the nipple 8 of the cylinder head 3.

At the same time, the nipple 6 of the cylinder head 2 is put in communication through the conduit 7, orifice 21 of the casing 20, port 28 of the plug, with the orifice 24 and with the coupling 26 on which fits the distributing hose.

In this position of the plug, the distribution is reversed, the piston 4 being moved from the head 3 towards the head 2. The operation of the distributing four-way cock above mentioned is effected from a distance and at any point of the length of the space to be served, by the angular displacement of a lever 30 which, rigidly secured on the plug of this cock, rocks between two abutments 31 secured on the supporting plate 5 and is connected, at its free end, either as shown, to a control bar guided so as to be capable of sliding between supporting collars 33. or to levers similar to 30 but pivoted at suitable fixed points.

I claim:—

1. An apparatus for successively distributing variable and adjustable quantities of liquids under pressure, comprising: a cylinder, two heads closing this cylinder in a fluid-tight manner, a piston freely movable in this cylinder,—means for adjusting and limiting the length of the stroke of this piston,—an orifice in each cylinder head and a conduit connected to each orifice,—a conduit for admitting the liquid to be distributed under pressure,—a conduit for the distribution of this liquid,—a cock casing perforated with four openings spaced about 90° apart adapted to receive the four above conduits,—a plug angularly moving in this cock, two ports provided in this plug and adapted to simultaneously put the liquid inlet conduit in communication with one of the conduits connected to one of the cylinder heads, and the liquid distributing conduit with the other conduit connected to the other cylinder head,—means for controlling from a distance the plug of the said four-way cock, and successively bringing it in two predetermined positions for reversing the distribution of the liquid into the cylinder; said adjusting and limiting means comprising a fixed abutment for the piston on one of said heads and an axially movable abutment for the piston threaded in the other of said heads.

2. An apparatus for successively distributing variable and adjustable quantities of liquids under pressure, comprising: a cylinder, two heads closing this cylinder in a fluid-tight manner, a piston freely movable in this cylinder,—a rod secured in the center of the piston for guiding the latter, a fixed socket provided in one of the cylinder heads and serving as a guide for one end of the piston rod and forming a fixed abutment to limit the movement of said piston in one direction, a sleeve threaded in the opposite cylinder head and serving as a guide for the other end of the piston rod and forming an adjustable abutment to limit the movement of said piston in the other direction, an orifice in each cylinder head and a conduit connected to each orifice, a conduit for admitting the liquid to be distributed under pressure, a conduit for the distribution of this liquid, a cock casing peforated with four openings adapted to receive the four above conduits, a plug angularly moving in this cock, two ports provided in this plug and adapted to simultaneously put the liquid inlet conduit in communication with one of the conduits connected to one of the cylinder heads, and the liquid distributing conduit with the other conduit connected to the other cylinder head, means for controlling from a distance the plug of the said four way cock, and successively bringing it in two predetermined positions for reversing the distribution of the liquid into the cylinder.

3. An apparatus for distributing liquids under pressure, comprising a cylinder, a head for each end of the cylinder fitting tightly thereon, a freely movable solid piston in the cylinder and a piston rod therefor, a socket for one end of the piston rod formed in one of said heads and constituting a fixed abutment in one direction for said piston, a sleeve threaded in the other of said heads and constituting a guide for the piston rod and an adjustable abutment for the piston, whereby to limit the stroke of the piston; a liquid distributing member, a conduit supplying liquid under pressure to said member, another conduit adapted to deliver liquid from said member to the place of utilization, pipes connecting said member with the two ends of said cylinder, and means in said member adapted to connect either of said pipes alternately with the supply conduit and the delivery conduit, whereby a desired quantity of said liquid will alternately be delivered to one end and received from the other end of the cylinder.

The foregoing specification of my "Apparatus for successively distributing variable and adjustable quantities of any liquids"; signed by me this 8th day of June, 1929.

JEAN KIENER.